Vosburg & Ludden,
Pencil.

No. 3683. Reissued Oct. 19. 1869.

Witnesses.

Charles Perley

Thos. Geo. Harwood

Wm. C. Vosburgh

Wm. A. Ludden

United States Patent Office.

WILLIAM C. VOSBURGH AND WILLIAM A. LUDDEN, OF BROOKLYN, NEW YORK, ASSIGNORS TO JOHN J. MERRITT, OF SAME PLACE, ASSIGNOR TO RUBBER-TIP PENCIL COMPANY, OF NEW YORK CITY.

*Letters Patent No.* 35,355, *dated May* 20, 1862; *reissue No.* 3,683, *dated October* 19, 1869.

IMPROVEMENT IN MEANS OF ATTACHING RUBBER TO PENCILS.

The Schedule referred to in these Letters Patent and making part of the same.

*To all whom it may concern:*

Be it known that we, WILLIAM C. VOSBURGH and WILLIAM A. LUDDEN, of Brooklyn, in the county of Kings, and State of New York, have invented, made, and applied to use a certain new and improved Means for Attaching Rubber to Pencils, &c.; and we do hereby declare that the following is a full, clear, and exact description thereof.

Small circular pieces of rubber have heretofore been attached to a pencil or pen-handle, by dressing down the end, and entering the same, with suitable cement, into a hole formed in the rubber, exactly as required for said use.

Our invention consists in the employment of a separate sleeve, or casing, fitting upon the pencil, and forming a means of attachment for the rubber.

It allows the rubber to be projected more or less from said case. It allows a gum-elastic cord or cylindrical piece of soft vulcanized rubber, of a proper composition, to be employed by cutting the same off in sections of the desired length. It affords great facility in applying the rubber to a pencil or pen-holder. It allows the same to be applied to either end of the pencil, and without any special preparation of the pencil being required. It allows for the introduction of a new piece of rubber, when necessary, and it sustains the rubber while being employed for erasing pencil-marks.

We will proceed to describe what we consider the best means of carrying out our invention, and will afterward designate the points which we believe to be new therein.

The annexed drawings form a part of this specification, wherein—

Figure 1:
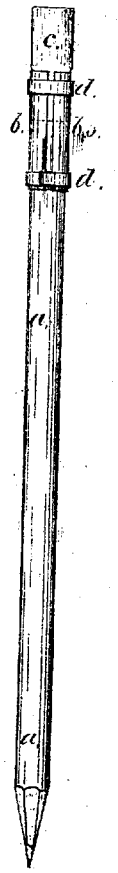
Figure 2:
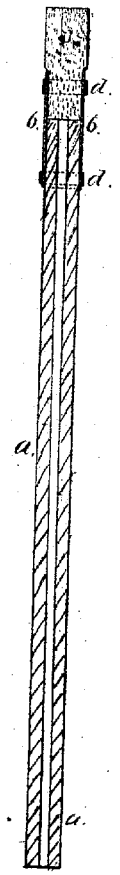

Figure 1 is an elevation of a pencil, with our improved means for attaching the rubber applied thereto; and Figure 2 is a vertical section of the same.

Similar marks of reference indicate the same parts in both the figures.

In both figures—

*a* is a pencil or a pen-handle;

*b b* are semi-cylindrical clamps, of metal or other suitable material;

*c* is a section of gum-elastic; and

*d d* are rings of metal or other material, slid over the pair of semi-cylindrical clamps, to bind them to the rubber and to the pencil or pen-handle, respectively.

The semi-cylindrical clamps should, for convenience in manufacturing, be both alike, as represented.

There will be a slight separation between these clamps, as shown in fig. 1, with the ordinary sizes of pencils or pen-handles.

The rings *d d* may be varied in size to suit the pencil, or but one ring may be employed, if desired.

What we claim, and desire to secure by Letters Patent, is as follows:

1. The combination, with a pencil of ordinary construction, of an India-rubber eraser and a metallic sleeve, or casing, holding the eraser and fitting the end of the pencil, substantially as and for the purposes herein specified.

2. The within-described construction of the said sleeve, or casing, to wit, the two semi-cylindrical clamps, *b b*, formed as specified, and the ring or rings *d*, in combination with the section of India rubber, *c*, and the pencil or pen-handle *a*, as and for the purposes herein set forth.

WM. C. VOSBURGH.
W. A. LUDDEN.

Witnesses:
D. M. ROWAN,
GEORGE MERRITT.